United States Patent
Nunn et al.

(10) Patent No.: US 12,169,559 B2
(45) Date of Patent: Dec. 17, 2024

(54) THREAT-EVALUATED CYBER DEFENSE

(71) Applicant: Bank of America Corporation, Charlotte, NC (US)

(72) Inventors: Daniel John Nunn, Bracknell (GB); Nicole Muryn Clement, Washington, DC (US); Michael Christopher Kosak, Charlotte, NC (US); David Anthony Sheronas, Matthews, NC (US); Sheenagh Alice Meghen, Camberley (GB)

(73) Assignee: Bank of America Corporation, Charlotte, NC (US)

( * ) Notice: Subject to any disclaimer, the term of this patent is extended or adjusted under 35 U.S.C. 154(b) by 224 days.

(21) Appl. No.: 17/939,120

(22) Filed: Sep. 7, 2022

(65) Prior Publication Data

US 2023/0090785 A1    Mar. 23, 2023

Related U.S. Application Data

(60) Provisional application No. 63/242,699, filed on Sep. 10, 2021.

(51) Int. Cl.
*G06F 21/55* (2013.01)
*G06F 21/57* (2013.01)

(52) U.S. Cl.
CPC ......... *G06F 21/554* (2013.01); *G06F 21/577* (2013.01); *G06F 2221/034* (2013.01)

(58) Field of Classification Search
CPC . G06F 21/554; G06F 21/577; G06F 2221/034
See application file for complete search history.

(56) References Cited

U.S. PATENT DOCUMENTS

| | | | |
|---|---|---|---|
| 9,083,741 B2 | 7/2015 | Powers | |
| 9,256,746 B2* | 2/2016 | Toback | G06F 21/577 |
| 9,306,965 B1 | 4/2016 | Grossman et al. | |
| 9,628,501 B2* | 4/2017 | Datta Ray | G06Q 10/0635 |
| 9,825,925 B2 | 11/2017 | Hore | |
| 10,686,819 B2* | 6/2020 | Mylavarapu | H04L 63/1441 |
| 11,252,188 B1 | 2/2022 | Lantuh et al. | |
| 11,294,700 B2* | 4/2022 | Cabrera | H04L 63/1425 |
| 11,379,773 B2 | 7/2022 | Vescio | |

(Continued)

OTHER PUBLICATIONS

Carver Analysis-IRP-FAS-Appendix (Year: 1991).*

(Continued)

*Primary Examiner* — Baotran N To (57) ABSTRACT

A system for improving data security for computing devices receives a data input stream indicating changes to data security threats posed to the computing devices. The system detects, based at least in part on the changes to the data security threats, a new data security threat posed to the computing devices. The system determines one or more available data security controls that align with the new data security threat. The one or more available data security controls comprise security countermeasures available to the computing devices for resolving the new data security threat. After determining that a security vulnerability rating is greater than a threshold value, at least one of the one or more available data security controls may be automatically implemented at the computing devices.

20 Claims, 3 Drawing Sheets

(56) References Cited

U.S. PATENT DOCUMENTS

| | | | |
|---|---|---|---|
| 11,616,791 B2* | 3/2023 | Mahadevia | H04L 63/1433 726/23 |
| 11,995,593 B2* | 5/2024 | Risoldi | G06F 21/554 |
| 2007/0067848 A1* | 3/2007 | Gustave | G06F 21/577 726/25 |
| 2007/0143851 A1* | 6/2007 | Nicodemus | H04L 63/1433 726/4 |
| 2011/0126111 A1* | 5/2011 | Gill | G06F 21/577 715/736 |
| 2015/0047046 A1* | 2/2015 | Pavlyushchik | H04L 63/1433 726/25 |
| 2015/0106939 A1* | 4/2015 | Lietz | H04L 63/1433 726/25 |
| 2016/0205081 A1 | 7/2016 | Simons et al. | |
| 2017/0330197 A1 | 11/2017 | Dimaggio et al. | |
| 2018/0270265 A1 | 9/2018 | Sage | |
| 2020/0050770 A1* | 2/2020 | Inagaki | G06F 21/577 |
| 2020/0278813 A1 | 9/2020 | Nilsson | |
| 2020/0389482 A1* | 12/2020 | Engle | H04L 63/1416 |
| 2021/0004878 A1 | 1/2021 | Hogg et al. | |
| 2021/0021644 A1* | 1/2021 | Crabtree | G06F 16/951 |
| 2022/0200956 A1 | 6/2022 | Lonas et al. | |
| 2022/0217163 A1 | 7/2022 | Frey et al. | |
| 2022/0222354 A1 | 7/2022 | Agarwwal | |
| 2022/0232027 A1 | 7/2022 | Ahn et al. | |
| 2022/0232031 A1 | 7/2022 | Bogren et al. | |
| 2022/0239674 A1 | 7/2022 | Mouleeswaran et al. | |
| 2022/0253534 A1 | 8/2022 | Biswas et al. | |
| 2022/0263853 A1 | 8/2022 | Izrael et al. | |
| 2022/0263860 A1 | 8/2022 | Crabtree et al. | |
| 2023/0009127 A1* | 1/2023 | Boyer | H04L 63/1425 |
| 2023/0038196 A1* | 2/2023 | Labreche | G06F 21/577 |

OTHER PUBLICATIONS

"JP Morgan is first leading bank to launch in the metaverse," Feb. 17, 2022, https://fintechmagazine.com/banking/jp-morgan-becomes-the-first-bank-to-launch-in-the-metaverse.

"Transforming the way money, information and assets move around the world," Printed on Mar. 11, 2024, JPMorgan Chase & Co.; https://www.jpmorgan.com/onyx/index.

* cited by examiner

THREAT-EVALUATED CYBER DEFENSE

RELATED APPLICATIONS

This application claims priority under 35 U.S.C. § 119 of U.S. Provisional Application Ser. No. 63/242,699, filed Sep. 10, 2021, entitled, "Threat-evaluated Cyber Defense," which is hereby incorporated by reference.

TECHNICAL FIELD

The present disclosure relates generally to information and data security technologies. More particularly, in certain embodiments, the present disclosure is related to threat-evaluated cyber defense.

BACKGROUND

Rapid changes in technology environments can introduce new vulnerabilities that must be assessed and mitigated to ensure security of data and related computer systems. New vulnerabilities result from the widespread and rapid adoption of new technologies, including but not limited to robotics, quantum computing, blockchain technology, technology virtualization, mobile technologies, social media, personal devices, third-party hosting, cloud computing and multi-tenant environments, as well as the increasingly interconnected relationships between different parties and systems globally. There exists a need for improved strategies for managing these vulnerabilities.

SUMMARY

As described above, there exists a need for improved strategies for managing vulnerabilities. Vulnerability may be represented as the product of the severity of a threat (e.g., related to information security-related attacks), the current vulnerability to the threat, and the severity of likely consequences of the threat. Previous technology is generally inefficient and potentially unreliable at least in part because it relies on manual vulnerability evaluations and is adapted to respond to completed vulnerability events (e.g., after an attack has already occurred).

Certain embodiments of this disclosure provide a security defense framework that includes a process to adjust cyber defense specific to an enterprise, based at least in part on the detailed evaluation of anticipated events overlaid with the real-world control environment. Certain embodiments of this disclosure may be integrated into the practical application of a security defense system configured to implement all or a portion of the processes of the security defense framework described in this disclosure. This security defense system provides improvements to data security technology, including those identified above, by, for example, (1) improving the efficiency and reliability of vulnerability detection, analysis, and prevention; (2) improving the security of electronically stored data and the underlying systems used to store this data; and (3) facilitating more proactive response to data security threats or vulnerabilities before corresponding incidents occur. For example, the disclosed system may provide improved security to data and the underlying systems storing data by using a threat-level approach in which a wide variety of threat sources are considered, rather than relying on inefficient and potentially unreliable vulnerability determinations that generally require substantial research and subjective decision making. In some embodiments, the security defense system of this disclosure enables increased proactive responses and continuous improvements for information and data security. In some embodiments, the defense framework of this disclosure facilitates a prioritized evaluation of exposure to threats and vulnerabilities aligned to a predefined vulnerability profile for an entity employing the framework. Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

This disclosure provides improvements to previous systems and methods used for data security. For example, the defense framework of this disclosure provides a consistent and repeatable process to identify and assess threats or emerging vulnerabilities, evaluate security controls, and define resolution actions to remediate vulnerabilities.

Figure 1:
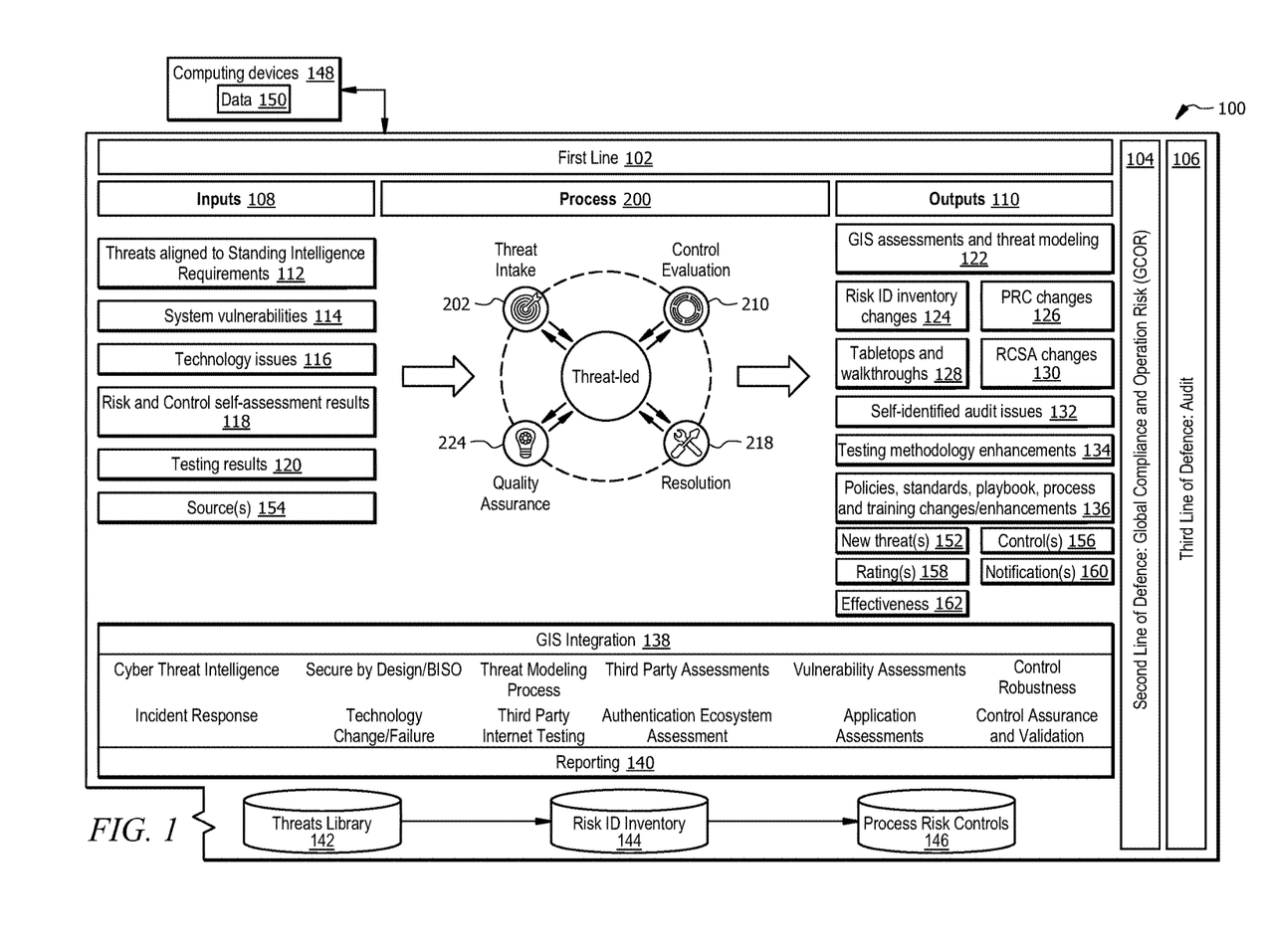
FIG. 1 is a diagram of an example security defense framework.

FIG. 1 illustrates an example security defense framework 100 of this disclosure. All or a portion of the processes of the security defense framework 100 may be implemented using the security defense system 300 of FIG. 3. The security defense framework 100 is generally used to improve the security of data 150 stored in computing devices 148 that are monitored using the security defense framework 100 (e.g., by the security defense system 300 of FIG. 3). The security defense framework 100 may be used to evaluate vulnerability of the devices 148 to data security compromise and define necessary remediation(s) based on an understanding of the effectiveness of available controls or countermeasures. The security defense framework 100 is designed to assess threats and emerging vulnerabilities, evaluate security controls and define actions to remediate exposure to threats and vulnerabilities. The security defense framework 100 may, for example, identify devices 148 for security enhancement and further strengthen the breadth and depth of cyber security controls allocated to these devices 148.

The security defense framework 100 includes a first defense line 102, a second defense line 104, and a third defense line 106. The first defense line 102 provides controls for mediating and managing information security vulnerability. The first defense line 102 includes a defense process 200 that provides improved threat-based vulnerability identification and resolution, as described in greater detail below and with respect to FIG. 2. The defense process 200 may be implemented by the security defense system 300 of FIG. 3, as described below. The second defense line 104 involves evaluation of the effectiveness of the controls developed at the first defense line 102. In the third defense line 106, the controls are audited to ensure appropriate vulnerability determination and mediation actions are being taken to satisfy security needs.

As illustrated in FIG. 1, inputs 108 are provided to process 200 (e.g., to the processor 302 of the security defense system 300) to generate outputs 110. Inputs 108 may be received as a data stream that includes computer-readable information identifying changes to the data security threats 112 posed to computing devices 148 being secured by the security defense framework 100. Examples of inputs 108 include predetermined data security threats 112 identified as being aligned to standing intelligence requirements. Data security threats 112 may include predefined categories of threats (e.g., from existing threat knowledge database(s)). Inputs 108 may include system vulnerabilities 114, such as identified or suspected vulnerabilities of internally generated software executed by devices 148. Inputs 108 may include technology issues 116, such as known or suspected security issues imposed by third-party software executed by devices 148 and/or other known or suspected vulnerabilities of the devices 148. Inputs 108 may include results from any number of determinations or other tests performed to identify threats, such as results 118 of vulnerability and control self-assessments and testing results 120. In the context of the security defense system 300 (described below with respect to FIG. 3), the inputs 108 may be received via network interface 306 and stored in memory 304.

The new defense process 200 for implementing the security defense framework 100 may be separated into distinct but intercommunicating actions that include threat intake 202, control evaluation 210, resolution 218, and quality assurance 224 (see FIG. 2 and TABLES 1-4 below for further details of process 200). Effective identification and categorization of threats and emerging vulnerabilities is one important step in cyber threat defense. Threat intake 202 is performed to determine sources 154 of threats and vulnerabilities for Geographic Information System (GIS) integration 138 (see below) and analyze and prioritize threats based on their estimated impact. For example, cyber threat intelligence and incident management may be key providers of threats on a daily basis. At threat intake 202, threats are identified from the inputs 108 and descriptors (e.g., current threat status, potential future threat status, etc.) may be assigned to each threat.

Control evaluation 210 identifies vulnerability IDs and controls that align to the new threat identified at threat intake 202. Control evaluation 210 also provides an understanding of the coverage, effectiveness, and resiliency of identified controls. For example, control evaluation 210 may involve leveraging knowledge from existing sources to complete a control evaluation. Control evaluation 210 may be performed automatically using established rules (e.g., included in the instructions 308 executed by the security defense system 300 of FIG. 3). In some cases, an analyst may engage the aligned control owner(s) and other stakeholders to understand and document the impact and exposure of the identified control(s) to the enterprise and critical application(s) (if any). The outcome of control evaluation 210 may be an assigned inherent vulnerability rating (high/moderate/low) and initial residual vulnerability rating (high/elevated/moderate/low/minimal) to the threat.

Resolution 218 includes tracking actionable items to enhance controls in order to mitigate gaps identified in control evaluation 210. At resolution 218, an analyst may review a resolution request in order to understand the root cause of the issue and impact. The analyst may assign resolution ownership to the resolution action to manage the performance of the initial vetting of new or existing issues including Problem Known Error (PKE), Self-Identified Audit Issue (SIAI), or other existing items (GIS, LOB or CIO Scheme).

Quality assurance (QA) 224 includes an independent review of identified issues. Quality assurance 224 includes communicating findings by marking as "Confirmed" or "Recycle", monitoring and validating evidence required to close resolution actions, and providing results and themes identified during quality assurance 224. Process 200 is described in greater detail below with respect to FIG. 2 and TABLES 1-4.

Outputs 110 of process 200 generally include information about identified threats, existing countermeasures to threats, and proposed controls or countermeasures to the threats, amongst other things. For example, the outputs 110 may include GIS determinations and threat modeling 122; vulnerability ID inventory changes 124 (see vulnerability ID inventory 144, described below); changes to mitigation processes including PRC changes 126 and RCSA changes 130; tabletops and walkthroughs 128 (e.g., associated with testing and assessing mitigations); self-identified audit issues 132, testing methodology enhancements 134; and/or other enhancements 136. In the context of the security defense system 300 (described below with respect to FIG. 3), the outputs 110 may be stored in memory 304 and/or provided to third parties via network interface 306.

Outputs 110 of process 200 may be integrated across GIS infrastructures, as illustrated by GIS integration 138 in FIG. 1, in order to support vulnerability identification and mitigation processes. This allows the threat-led process 200 to provide reliably updated knowledge on threats and vulnerabilities so that this knowledge can be leveraged for vulnerability determinations and control testing. Examples of vulnerability determination and control testing facilitated by GIS integration are indicated in FIG. 1. GIS integration 138 may allow improved defense tools (e.g., for mitigating certain identified threats) to be effectively implemented.

Information obtained during process 200 (e.g., outputs 110) and/or via GIS integration 138 may be used for reporting 140. Reporting 140 may involve maintaining a vulnerability ID inventory 144, for example, to include vulnerability IDs determined in process 200 (e.g., during control evaluation 210). Reporting 140 may involve maintaining a threats library 142, for example, to include new threats identified in process 200. Information from the threats library 142 may inform entries added/changed in the vulnerability ID inventory 144, and information in the vulnerability ID inventory 144 may inform information added/changed in the process vulnerability controls 146.

In an example operation of a system (e.g., the security defense system 300 of FIG. 3) configured to implement the security defense framework 100 of FIG. 1, a memory of the device (e.g., memory 304 of FIG. 3) stores the data security threat library 142, which includes predefined security vulnerabilities known for the computing devices 148. The memory (e.g., memory 304 of FIG. 3) may also store the risk ID inventory 144 and/or the process risk controls 146. For example, the process risk controls 146 may include process risk controls corresponding to countermeasures for the predefined security threats included in the data security threat library 142.

The system receives inputs 108 as a data input stream that indicates changes to data security threats posed to computing devices 108. These changes to the data security threats posed to devices 148 may include newly identified data security threats from one or more existing threat knowledge databases (e.g., the predefined security threats 112), newly identified or suspected data security vulnerabilities of internally generated software executed by the devices 148 (e.g., determined from results 118 and/or 120), newly identified or suspected data security vulnerabilities of third-party software executed by the plurality of computing devices (e.g., determined from results 118 and/or 120), and newly identified or suspected data security vulnerabilities of the plurality of computing devices (e.g. based on system vulnerabilities 114 and/or technology issues 116). For example, the inputs 108 (e.g., the data input stream) may include or be based on results 118, 120 of data security tests performed on one or more of the devices 148.

The system then uses process 200 to detect, based at least in part on the changes to the data security threats, a new data security threat 152 posed to the devices 148 storing data 150. For example, the system may detect the new data security threat 52 posed to the devices 148 by determining a source 154 of the changes to the data security threats posed to the devices 148. For example, certain sources 154 may be known to pose an increased data security threat than others. The new data security threat 152 may be determined based at least in part on assessment and/or test results 118, 120. The new data security threat 152 may be a data security threat not originally stored in the threat library 142. The system may update the data security threat library 142 to include the new data security threat 152.

One or more available data security controls 156 are then determined that align with the new data security threat 152 (e.g., using information from the risk ID inventory 144 and/or process risk controls 146). The available data security controls 156 include security countermeasures available to the devices 148 for resolving the new data security threat 152. For example, the countermeasures may involve changing hardware and/or software configurations of devices 148 to counteract the new data security threat 152. The system may update the process risk controls 146 to include the one or more available data security controls 156 that align with the new data security threat 152. In this way, improvements are automatically provided to the information available to resolve data security threats/vulnerabilities in the future.

The system then determines a security vulnerability rating 158 for the new data security threat 152 based at least in part on the available data security controls 156. Examples of determining vulnerability ratings 158 are provided below with respect to the example of FIG. 2. As an example, the security vulnerability rating 158 for the new data security threat 152 may be determined based at least in part on a number of the devices 148 that can be impacted by the new data security threat 152 and/or a type of the data 150 impacted by the new data security threat 152.

If the security vulnerability rating 158 is greater than a threshold value (e.g., included in instructions 308 of FIG. 3), the system may automatically implement one or more of the available data security controls 156 determined for the new data security threat 152. This provides a more rapid and efficient resolution to potential security vulnerabilities than was previously possible. As such, the system may improve the security of data 150 stored in the devices 148. If the security vulnerability rating 158 is less than the threshold value, a notification 160 may be sent requesting review and testing of the new data security threat 152. For example, the outputs 110 may include such a notification 160.

The new data security threat 152 and the one or more available data security controls 156 that align with the new data security threat 152 may be integrated into a GIS via GIS integration 138. As described above, GIS integration 138 may allow knowledge on the new data security threat 152 to be leveraged for vulnerability determinations and control testing in the future. GIS integration 138 may also facilitate improved reporting 140 by more reliably and efficiently managing information stored in the threat library 142, risk ID inventory 144, and process risk controls 146.

The system may further perform at least a portion of the operations included in the second defense line 104 and third defense line 106. For example, the system may determine an effectiveness 162 of the data security controls 156 that are automatically implemented for the new data security threat 152. For example, the effectiveness 162 of the controls 156 may be determined by monitoring the security status of the devices 148 after the data security controls 156 are implemented. If the effectiveness 162 is above threshold (e.g., included in the instructions 308 of FIG. 3), no further action may be needed, or the controls 156 may be given a high effectiveness score. However, if the effectiveness 162 is below a threshold, a notification 160 or other flag may be provided to indicate further data security review is needed.

Example Threat-Defense Process

Figure 2:
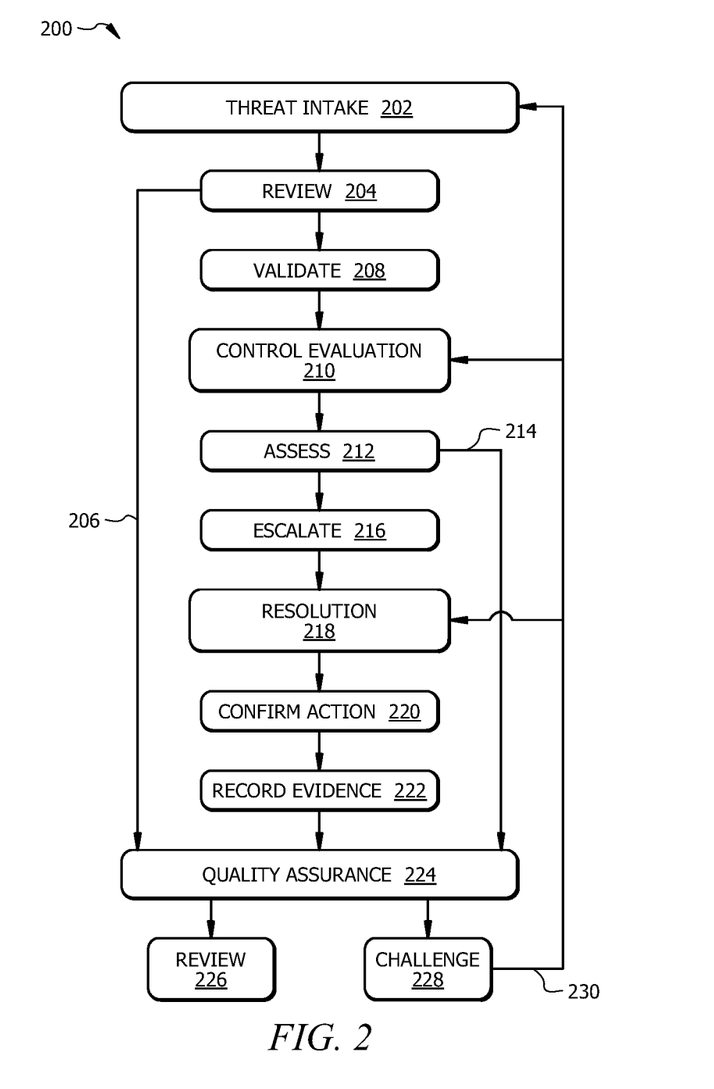
FIG. 2 is a flow diagram illustrating an example defense process of the security defense framework of FIG. 1.

FIG. 2 illustrates an example of the defense process 200 shown schematically in FIG. 1. Process 200 may be implementing using the processor 302, memory 304, and network interface 306 of the security defense system 300 of FIG. 3. Process 200 may begin with threat intake 202. At threat intake 202, threats 152 from inputs 108 of FIG. 1 are reviewed. TABLE 1 below shows further details of example inputs and outputs that may be generated during threat intake 202.

TABLE 1

Example inputs and outputs of threat intake 202.

| | Description | Purpose | Example |
|---|---|---|---|
| Input | | | |
| Cyber Threats | An activity, deliberate or unintentional, with the potential for causing harm to an automated information system or activity. | Cyber threats, also referred to as "threats," are captured during threat intake by analysts and are prioritized via a Threat Intake Template | Destructive Malware, DDoS, Disruptive Malware, Mobile Malware, Theft of Intelligence Property, Internet of Things, Malware Targeting Customers, Emerging Threats, Social Engineering, Insider Threats, etc. |

TABLE 1-continued

Example inputs and outputs of threat intake 202.

| | Description | Purpose | Example |
|---|---|---|---|
| Risk ID Inventory | There are 172 Risk IDs that may directly be affected by a cyber security event and are, therefore, included in the Threats and Vulnerabilities analysis. These may be operational, technology, and cyber security risks. | Threat categories are mapped to Risk IDs to more efficiently align new threats and vulnerabilities during threat intake. Risk IDs are then mapped to a control library in order to align new threats to specific controls/mitigations. | |
| Output | | | |
| Threat Input Score | Threat intake form with threat prioritization based on vulnerability rating. Example methodology: Step 1: Determine if the cyber threat intelligence (CTI) Determination is High or if the threat is of importance, then the threat priority is an automatic High severity rating. Step 2: If the threat is Moderate or Low and not of importance, then have an overall rating based on predetermined required questions in the threat intake form. Severity level rating: High (26-32); Moderate (22-25); Low (0-22) | To prioritize threats and determine vulnerability posed by the threat as "High, Moderate, or Low" | Scoring Key High 3 Moderate 2 Low 1 Scoring Range High 26-32 Moderate 22-25 Low 0-21 |

Following threat intake 202, a review of the threat(s) 152 is performed at step 204 to determine whether each identified threat 152 should be routed to control evaluation 210 (e.g., if medium or high threat level) or provided directly to quality assurance 224 (e.g., is low threat level) via route 206 of FIG. 2. At step 208, the process 200 may then validate the threats 152 to determine potential consequences of the threat(s) 152 (e.g., a possible negative outcome if a threat is encountered).

Validated threats from step 208 are provided for control evaluation 210. As described above with respect to FIG. 1, control evaluation 210 identifies vulnerability IDs and controls 156 that align to the new threats 152 identified at threat intake 202. Control evaluation 210 also provides an understanding of the coverage, effectiveness, and resiliency of identified controls 156. TABLE 2 below shows further details of example inputs and outputs that may be generated during control evaluation 210.

TABLE 2

Example inputs and outputs of control evaluation 210.

| | Description | Purpose | Example |
|---|---|---|---|
| Input | | | |
| PRC Inventory | Foundational to ongoing operational vulnerability monitoring and governance routines including the annual | Use Vulnerability IDs to identify the PRC controls aligned to each threat and utilize that | Link |

TABLE 2-continued

Example inputs and outputs of control evaluation 210.

|  | Description | Purpose | Example |
| --- | --- | --- | --- |
|  | Vulnerability and Compliance Self-Assessment (RCSA) and monthly Process Robustness Dashboard, metric value updates and control performance ratings, monthly determinations of impacted process ratings and remediation of deficient controls. | information to complete the Control Evaluation Questionnaire. |  |
| Control evaluation Questionnaire | The Control Evaluation Questionnaire will be completed after receiving the completed threat intake form. Observations and gaps identified from the completed questionnaire will be escalated to QA/Resolution | The purpose of the questionnaire is to gain an understanding of control coverage and effectiveness for vulnerabilities related to new threats. | Link |
| Output |  |  |  |
| Control evaluation rating | Rating is determined by responses to the Control Evaluation Questionnaire which provides a numerical score. Then a final Control Evaluation rating is determined based on inputs from the Resolution team. | The alignment of control owner(s) to understand the impact and exposure of the identified control(s) to the enterprise and critical application(s). | High/ Moderate/ Low |
| Inherent vulnerability rating and Residual vulnerability rating | Inherent vulnerability rating is determined based on the Threat Prioritization Rating and the PRC Residual Vulnerability Rating of the Control Evaluation identified in scope controls. Taking the inherent vulnerability rating and Initial Control Evaluation Rating and based on conversations and feedback from the Control Owner(s) of the identified in-scope controls the initial residual vulnerability is calculated. This residual rating is supported by an algorithmic calculation which provides a 'hard deck' for the lowest allowed level of rating that the analyst can provide. | The prioritization of understanding the most critical threats and documentation of any known issues/ observations aligned to the identified controls. | High/ Moderate/ Low |

Following control evaluation 210, the process 200 may proceed to step 212 to assess the performance of controls 156 for mitigating or otherwise acting as countermeasures for threats 152. Threats with a control 156 that results in a low vulnerability rating 158 may be provided directly to quality assurance 224 via route 214. Threats with controls that have medium or high vulnerability ratings 158 are provided to step 216. At step 216, the process 200 may escalate any threats 152 with a vulnerability rating 158 that is greater than a threshold level (e.g., high or very high vulnerability). For example, the threat 152 may be flagged to indicate immediate action is needed.

Threats 152 are then provided for resolution 218. As described above, resolution 218 includes tracking actionable items to enhance controls 156 in order to mitigate gaps identified in control evaluation 210. TABLE 3 below shows further details of example inputs and outputs that may be generated during resolution 218.

TABLE 3

Example inputs and outputs of resolution 218.

| | Description |
|---|---|
| Input | |
| Control Evaluation results and initial vulnerability rating<br>Analysis of gaps/enhancements<br>Problem Known Area (PKEs)<br>SIAIs | Control Evaluation rating is determined based on inputs from the Resolution team and discussed with control owners to obtain the initial vulnerability rating. Documentation of Gaps in controls and coverage effectiveness to hand over to Resolution team to review and disposition resolution request. |
| Output | |
| Resolution tracking and actionable items<br>Threat Closure Report (TCR)<br>Final Threat Closure Report (FSR)<br>Thematic Reports | Documentation and assignment of resolution owner for the tracking of the resolution action to completion. TCR is completed after the initial analysis of the resolution request, then relevant stakeholders are engaged to identify actions needed to resolve and mitigate threat. The final report is created with lessons learned completed and resolution actions completed. |

Following resolution 218, the process 200 may proceed to step 220 to confirm actions needed to control or mitigate threats 152. At step 222, evidence related to implementing the actions from step 220 is recorded.

Threats 152 and subsequent control evaluation and any associated resolution decisions or actions are then provided for quality assurance 224. As described above, quality assurance 224 includes communicating findings by marking as "Confirmed" or "Recycle", monitoring and validating evidence required to close resolution actions, and providing results and themes identified during quality assurance 224. TABLE 4 below shows further details of example inputs and outputs that may be generated during quality assurance 224.

TABLE 4

Example inputs and outputs of quality assurance 224.

| | Description |
|---|---|
| Input | |
| Control Evaluation results and initial vulnerability rating | Control evaluation results<br>Review on batch basis of individual threat defense alert dispositioning<br>Problem Owner Documents Action Items, PKEs, Lessons Learned, EBIs and New Vulnerability Concerns<br>Initial Findings Report |

TABLE 4-continued

Example inputs and outputs of quality assurance 224.

| | Description |
|---|---|
| Output | |
| Resolution tracking and actionable items | Opportunities for process improvement/QA Findings<br>Thematic reporting of the threat landscape<br>PKE Action Item Closure QA performed<br>Record is updated as required by RTQA (Real Time Quality Assurance) results<br>Initial Findings Report (IFR) is created and sent for feedback according to Service Level Agreement (SLA).<br>Final Summary Report is created and sent after three day feedback period for the IFR. |

At step 226, outputs (e.g., one or more of the outputs 110 of FIG. 1) of the process 200 are reviewed. Review may be performed by the security defense system 300 of FIG. 3. In some embodiments, an analyst may provide supplemental review of the outputs (e.g., one or more of outputs 110) of the process 200. At step 228, results may be challenged (e.g., if the outputs 110 fall outside an expected range). For example, the security defense system 100 may flag certain outputs and/or send an alert or notification 160 to an appropriate party regarding flagged outputs 110. In some cases, an analyst may provide a supplemental challenge to results of any of the portions of the process 200, for example, by requesting further information via route 230. Although the process 200 is illustrated as a sequential process, it should be understood that steps may be performed in different orders, and steps may be interconnected as illustrated in FIG. 1. For example, if insufficient information about threats 152 is available during resolution 218, the process 200 may return to perform further threat intake 202.

Example Security Defense System

Figure 3:
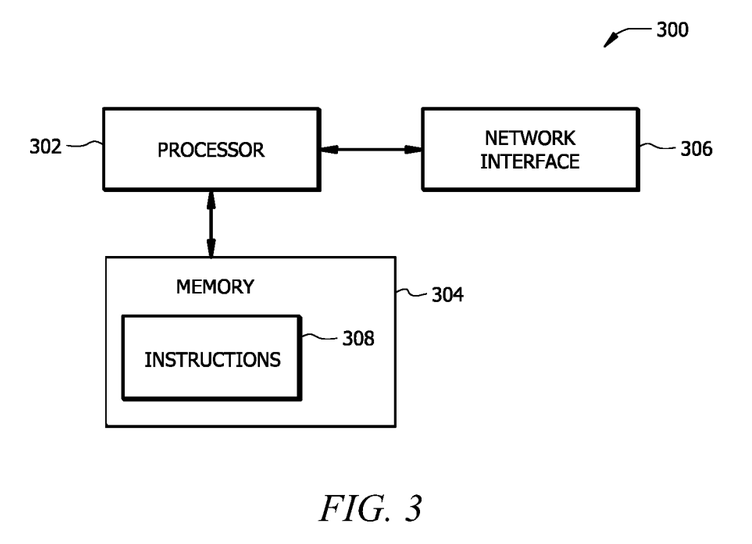
FIG. 3 is a diagram of an example security defense system for implementing the security defense framework of FIG. 1 and the defense process of FIG. 2.

As described above, in certain embodiments, all or portion of the defense process 200 is performed by a security defense system. FIG. 3 illustrates an example of a security defense system. The security defense system 300 includes a processor 302, memory 304, and network interface 306. The processor 302 of the security defense system 300 includes one or more processors. The processor 302 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304 and network interface 306. The one or more processors are configured to process data and may be implemented in hardware and/or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory 304 and executes them by directing the coordinated operations of the ALU, registers and other components. In an embodiment, the function of the security defense system 300 described herein is implemented using logic units, FPGAs, ASICs, DSPs, or any other suitable hardware or electronic circuitry.

The memory 304 of the security defense system 300 is operable to store any data, instructions, logic, rules, or code operable to execute the functions of the security defense system 300. The memory 304 may store instructions 308 for implementing the defense process 200 described with respect to FIGS. 1 and 2 above. The memory 304 includes one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The network interface 306 of the security defense system 300 is configured to enable wired and/or wireless communications. The network interface 306 is configured to communicate data between the security defense system 300 and other network devices, systems, or domain(s). The network interface 306 is an electronic circuit that is configured to enable communications between devices. For example, the network interface 306 may include one or more serial ports (e.g., USB ports or the like) and/or parallel ports (e.g., any type of multi-pin port) for facilitating this communication. As a further example, the network interface 306 may include a WIFI interface, a local area network (LAN) interface, a wide area network (WAN) interface, a modem, a switch, or a router. The processor 302 is configured to send and receive data using the network interface 306. The network interface 306 may be configured to use any suitable type of communication protocol as would be appreciated by one of ordinary skill in the art. The network interface 306 communicates may receive inputs 108 and communicate outputs 110 of FIG. 1.

While several embodiments have been provided in this disclosure, it should be understood that the disclosed system and method might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for improving data security for a plurality of computing devices, the system comprising:
a memory operable to store a data security threat library comprising predefined data security threats posed to the plurality of computing devices; and
a processor communicatively coupled to the memory and configured to:
receive a data input stream indicating changes to the data security threats posed to the plurality of computing devices, wherein the changes to the data security threats comprise one or more of: newly identified data security threats from one or more existing threat knowledge databases, newly identified or suspected data security vulnerabilities of internally generated software executed by the plurality of computing devices, and newly identified or suspected data security vulnerabilities of third-party software executed by the plurality of computing devices, wherein the data input stream comprises a plurality of predefined categories of threats;
detect, based at least in part on the changes to the data security threats, a new data security threat posed to the plurality of computing devices;
map, from the plurality of predefined categories of threats, one or more predefined categories of threat associated with the new data security threat to one or more known vulnerability IDs, wherein each vulnerability ID is associated with a respective known vulnerability of the computing devices and the one or more vulnerability IDs are mapped to one or more available data security controls comprising security countermeasures associated with the respective known vulnerabilities;
determine, based at least on the one or more known vulnerability IDs, one or more available data security controls that align with the new data security threat, wherein the one or more available data security controls are mapped to the one or more known vulnerability IDs and comprise security countermeasures available to the plurality of computing devices for resolving the new data security threat;
determine, based at least in part on the one or more available data security controls, a security vulnerability rating for the new data security threat;

determine that the security vulnerability rating is greater than a threshold value; and after determining that the security vulnerability rating is greater than a threshold value, automatically implement at least one of the one or more available data security controls at the plurality of computing devices, thereby improving security of data stored in the plurality of computing devices.

2. The system of claim 1, wherein:

the changes to the data security threats comprise information not previously included in the data security threat library;

the memory is further configured to store process risk controls comprising countermeasures for the predefined security threats included in the data security threat library; and the processor is further configured to update the data security threat library to include the new data security threat and update the process risk controls to include the one or more available data security controls that align with the new data security threat, thereby providing automatic improvements to the data security threat library and the process risk controls.

3. The system of claim 1, wherein the processor is further configured to detect the new data security threat posed to the plurality of computing devices by determining a source of the changes to the data security threats posed to the plurality of computing devices.

4. The system of claim 3, wherein the processor is further configured to store, in the memory, the new data security threat and the one or more available data security controls that align with the new data security threat in a geographic information system.

5. The system of claim 1, wherein the processor is further configured to determine the security vulnerability rating for the new data security threat based at least in part on one or both of a number of the plurality of computing devices impacted by the new data security threat and a type of data impacted by the new data security threat.

6. The system of claim 1, wherein the data input stream includes results from data security tests performed on one or more devices of the plurality of computing devices, wherein the new data security threat is determined based on the results.

7. The system of claim 1, wherein the processor is further configured to:

detect, based at least in part on the changes to the data security threats, a second new data security threat posed to the plurality of computing devices;

determine a second security vulnerability rating for the second new data security threat;

determine that the second security vulnerability rating is less than the threshold value; and after determining that the second security vulnerability rating is less than the threshold value, send a notification requesting review and testing of the second new data security threat.

8. The system of claim 1, wherein the processor is further configured to determine an effectiveness of the one or more data security controls that are automatically implemented for the new data security threat by monitoring a security status of the plurality of computing devices after the one or more data security controls are implemented.

9. A method for improving data security for a plurality of computing devices, the method comprising:

storing, in a memory, a data security threat library comprising predefined data security threats posed to the plurality of computing devices;

receiving a data input stream indicating changes to the data security threats posed to the plurality of computing devices, wherein the changes to the data security threats comprise one or more of: newly identified data security threats from one or more existing threat knowledge databases, newly identified or suspected data security vulnerabilities of internally generated software executed by the plurality of computing devices, and newly identified or suspected data security vulnerabilities of third-party software executed by the plurality of computing devices, wherein the data input stream comprises a plurality of predefined categories of threats;

detecting, based at least in part on the changes to the data security threats, a new data security threat posed to the plurality of computing devices;

mapping, from the plurality of predefined categories of threats, one or more predefined categories of threat associated with the new data security threat to one or more known vulnerability IDs, wherein each vulnerability ID is associated with a respective known vulnerability of the computing devices and the one or more vulnerability IDs are mapped to one or more available data security controls comprising security countermeasures associated with the respective known vulnerabilities;

determining, based at least on the one or more known vulnerability IDs, one or more available data security controls that align with the new data security threat, wherein the one or more available data security controls are mapped to the one or more known vulnerability IDs and comprise security countermeasures available to the plurality of computing devices for resolving the new data security threat;

determining, based at least in part on the one or more available data security controls, a security vulnerability rating for the new data security threat;

determining that the security vulnerability rating is greater than a threshold value; and after determining that the security vulnerability rating is greater than a threshold value, automatically implementing at least one of the one or more available data security controls at the plurality of computing devices, thereby improving security of data stored in the plurality of computing devices.

10. The method of claim 9, wherein:

the changes to the data security threats comprise information not previously included in the data security threat library;

the method further comprises:

storing, in the memory, process risk controls comprising countermeasures for the predefined security threats included in the data security threat library; and updating the data security threat library to include the new data security threat and updating the process risk controls to include the one or more available data security controls that align with the new data security threat, thereby providing automatic improvements to the data security threat library and the process risk controls.

11. The method of claim 9, further comprising detecting the new data security threat posed to the plurality of computing devices by determining a source of the changes to the data security threats posed to the plurality of computing devices.

12. The method of claim 11, further comprising storing, in the memory, the new data security threat and the one or more available data security controls that align with the new data security threat in a geographic information system.

13. The method of claim 9, further comprising determining the security vulnerability rating for the new data security threat based at least in part on one or both of a number of the plurality of computing devices impacted by the new data security threat and a type of data impacted by the new data security threat.

14. The method of claim 9, wherein the data input stream includes results from data security tests performed on one or more devices of the plurality of computing devices, wherein the new data security threat is determined based on the results.

15. The method of claim 9, further comprising:
 detecting, based at least in part on the changes to the data security threats, a second new data security threat posed to the plurality of computing devices;
 determining a second security vulnerability rating for the second new data security threat;
 determining that the second security vulnerability rating is less than the threshold value; and
 after determining that the second security vulnerability rating is less than the threshold value, sending a notification requesting review and testing of the second new data security threat.

16. The method of claim 9, further comprising determining an effectiveness of the one or more data security controls that are automatically implemented for the new data security threat by monitoring a security status of the plurality of computing devices after the one or more data security controls are implemented.

17. A non-transitory computer-readable medium storing instructions that, when executed by a processor, cause the processor to:
 receive a data input stream indicating changes to data security threats posed to a plurality of computing devices, wherein the changes to the data security threats comprise one or more of: newly identified data security threats from one or more existing threat knowledge databases, newly identified or suspected data security vulnerabilities of internally generated software executed by the plurality of computing devices, and newly identified or suspected data security vulnerabilities of third-party software executed by the plurality of computing devices, wherein the data input stream comprises a plurality of predefined categories of threats;
 detect, based at least in part on the changes to the data security threats, a new data security threat posed to the plurality of computing devices;
 map, from the plurality of predefined categories of threats, one or more predefined categories of threat associated with the new data security threat to one or more known vulnerability IDs, wherein each vulnerability ID is associated with a respective known vulnerability of the computing devices and the one or more vulnerability IDs are mapped to one or more available data security controls comprising security countermeasures associated with the respective known vulnerabilities;
 determine, based at least on the one or more known vulnerability IDs, one or more available data security controls that align with the new data security threat, wherein the one or more available data security controls are mapped to the one or more known vulnerability IDs and comprise security countermeasures available to the plurality of computing devices for resolving the new data security threat;
 determine, based at least in part on the one or more available data security controls, a security vulnerability rating for the new data security threat;
 determine that the security vulnerability rating is greater than a threshold value; and
 after determining that the security vulnerability rating is greater than a threshold value, automatically implement at least one of the one or more available data security controls at the plurality of computing devices, thereby improving security of data stored in the plurality of computing devices.

18. The non-transitory computer-readable medium of claim 17, wherein the instructions, when executed by the processor, further cause the processor to detect the new data security threat posed to the plurality of computing devices by determining a source of the changes to the data security threats posed to the plurality of computing devices.

19. The non-transitory computer-readable medium of claim 17, wherein the instructions, when executed by the processor, further cause the processor to determine the security vulnerability rating for the new data security threat based at least in part on one or both of a number of the plurality of computing devices impacted by the new data security threat and a type of data impacted by the new data security threat.

20. The non-transitory computer-readable medium of claim 17, wherein the instructions, when executed by the processor, further cause the processor to determine an effectiveness of the one or more data security controls that are automatically implemented for the new data security threat by monitoring a security status of the plurality of computing devices after the one or more data security controls are implemented.

* * * * *